(12) United States Patent
Ushio

(10) Patent No.: US 8,305,623 B2
(45) Date of Patent: Nov. 6, 2012

(54) IMAGE FORMING APPARATUS PROVIDED WITH FUNCTION OF DETECTING ERRORS IN PRINTING PROCESS

(75) Inventor: Masaru Ushio, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 1274 days.

(21) Appl. No.: 11/518,676

(22) Filed: Sep. 11, 2006

(65) Prior Publication Data

US 2007/0159644 A1 Jul. 12, 2007

(30) Foreign Application Priority Data

Jan. 11, 2006 (JP) ................................. 2006-003633

(51) Int. Cl.
 *G06K 15/00* (2006.01)
 *G06F 3/12* (2006.01)
(52) U.S. Cl. ...................... 358/1.16; 358/1.14; 358/1.17
(58) Field of Classification Search ................. 358/1.14, 358/1.16, 1.17
See application file for complete search history.

(56) References Cited

U.S. PATENT DOCUMENTS

| 4,849,821 A * | 7/1989 | Allen et al. .................... 358/405 |
| 5,473,735 A | 12/1995 | Murakami |
| 5,684,934 A | 11/1997 | Chen et al. |
| 6,307,981 B1 * | 10/2001 | Kamei et al. .................. 382/309 |
| 2001/0043723 A1 | 11/2001 | Kadota et al. |
| 2003/0053130 A1 | 3/2003 | Omo |

FOREIGN PATENT DOCUMENTS

| EP | 0 619 562 A1 | 10/1994 |
| EP | 0 711 062 A1 | 8/1996 |
| JP | 6-138769 | 5/1994 |
| JP | 8-44257 | 2/1996 |
| JP | 10-105009 | 4/1998 |
| JP | 2000-32199 | 1/2000 |

OTHER PUBLICATIONS

European Search Report for Application No. 06254701.3-1522 dated Apr. 27, 2007.

* cited by examiner

*Primary Examiner* — Twyler Haskins
*Assistant Examiner* — Fred Guillermety
(74) *Attorney, Agent, or Firm* — Cantor Colburn LLP

(57) ABSTRACT

In a copying machine having an image memory that stores image data, a DRAM control IC that repetitively reads out image data from the image memory, and an image forming section that forms the images for the specified number of copies, a write processing section having a number of pixels counter that counts the number of pixels included in the image data for the predetermined number of pages at the time of reading, a first memory that stores the count value for the $n^{th}$ copy, a second memory that stores the count value for the $(n+1)^{th}$ copy, and an image control CPU that compares the count value stored in the first memory with the count value stored in the second memory and thereby judges the occurrence of errors in the print process if the two counts are not equal to each other and carries out error processing.

20 Claims, 11 Drawing Sheets

FIG. 6

| | JOB DATA | |
|---|---|---|
| PAGE COMMON DATA | SET NUMBER OF COPIES | 3 | 
| | SHEET FEED COUNTER | 3 |
| | SHEET DISCHARGE COUNTER | 2 |
| | COPY MODE | SINGLE-SIDE > SINGLE-SIDE |
| | SELECTED TRAY | TRAY 3 |
| | NUMBER OF IMAGES READ OUT | 3 |
| | OUTPUT PAGE | 3 |
| | NUMBER OF COPIES OUTPUT | 0 |
| | NUMBER OF PIXELS CUMULATIVE COUNTER (N) | $N = N + N_2$ |
| | CUMULATIVE VALUE OF NUMBER OF PIXELS OF FIRST COPY (L) | 0 |
| | INCORRECT PAGINATION FLAG | 0 |
| PAGE-WISE DATA | PAGE 1 — IMAGE STORAGE ADDRESS | 01*** |
| | PAGE 2 — IMAGE STORAGE ADDRESS | 02*** |
| | PAGE N — IMAGE STORAGE ADDRESS | 0N*** |

Columns: $D_1, D_2, D_3, D_4, D_5, D_6, D_7, D_8, D_9, D_{10}, D_{11}$

141i: PAGE COMMON DATA section
141ii: PAGE-WISE DATA section

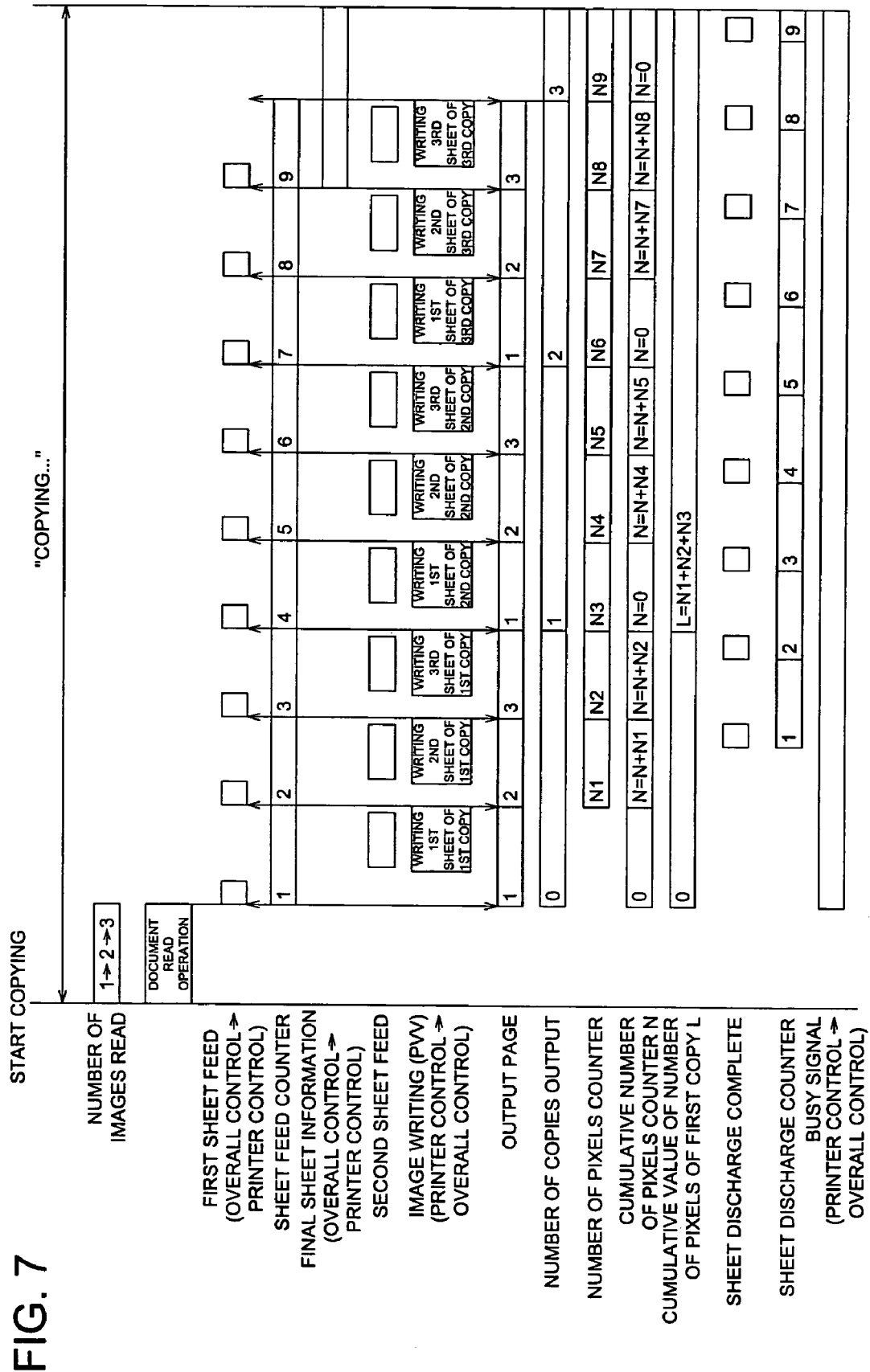

IMAGE FORMING APPARATUS PROVIDED WITH FUNCTION OF DETECTING ERRORS IN PRINTING PROCESS

RELATED APPLICATION

The present application is based on Japanese Patent Application No. 2006-3633 filed on Jan. 11, 2006, the content of which is incorporated herein by reference.

FIELD OF THE INVENTION

The present invention relates to image forming apparatuses, computer-readable storage medium, and methods of detecting error of printing process in an image forming apparatus, and in particular, to an image forming apparatus or computer-readable storage medium provided with the function of detecting errors in the printing process, and to the method of detecting errors in image forming apparatuses.

BACKGROUND OF THE INVENTION

Conventionally, image forming apparatuses equipped with different types of detection functions have been proposed as the image forming apparatuses such as copying machines that acquire image data by reading out the images recorded on the original document and carry out image formation on recording sheets of the images of that image data.

For example, in Patent Document 1, an image forming apparatus has been described that counts the number of successive dots, and detects the residual quantity of toner by summing the toner consumption quantity for each dot.

Further, in Patent Document 2, an image forming apparatus has been described that detects the residual quantity of toner by detecting the print ratio per page and the magnitude of the developing electrical charge.

In addition, in Patent Document 3, an image forming apparatus has been described that sums the number of black dots included in the pages to be printed after replacing the toner cartridge, and detects the extent of use of the toner cartridge from the ratio of this number of dots to the total number of dots that can be printed with one toner cartridge.

Further, in Patent Document 4, an image forming apparatus has been described that has a display section that displays the number of pixels of a particular color or the ratio of that number of pixels to the entire page.

On the other hand, in recent years, there are ever increasing numbers of functions installed in an image forming apparatus, and the large software for realizing these functions has become the cause of generating latent bugs. In addition, in the case of image forming apparatuses delivered to businesses that output as sold products a large number of copies of booklets, the problem of erratic pagination or missing printed pages of books is a serious problem and even bugs in the software can also be causes of erratic pagination or missing printed pages of a book.

[Patent Document 1] JP-A No. 6-138769 (Hereinafter, JP-A refers to Japanese Patent Publication Open to Public Inspection)
[Patent Document 2] JP-A No. 8-044257
[Patent Document 3] JP-A No. 10-105009
[Patent Document 4] JP-A No. 2000-032199

However, in the inventions disclosed in Patent Document 1 to Patent Document 3, all of these inventions are related to detecting the residual quantity of toner using the print ratio, and also, the invention disclosed in Patent Document 4 is related to displaying the print ratio, but none of these inventions was able to detect erratic pagination or missing printed pages of books.

SUMMARY OF THE INVENTION

The present invention was made in view of the above described point, and the object of the present invention is to provide an image forming apparatus, or program, or a method of detecting errors in the printing process in an image forming apparatus that make it possible to detect easily erratic pagination or missing printed pages of books in the middle of the printing process.

One of the preferred embodiments of the present invention is an image forming apparatus that includes the following:

a storage section that stores image data;

a read out control section that repetitively reads out said image data from said storage section;

an image forming section that forms images for a specified number of copies based on the image data read out by said read out control section;

a counter that counts for each of a predetermined number of pages the number of pixels included in the read out image data at the time of reading out said image data by said read out control section;

a first memory section that stores a count value for the $n^{th}$ copy counted by said counter at the time of reading out the image data of the $n^{th}$ copy (where n is an integer equal to 1 or more but less than the specified number of copies) by said read out control section;

a second memory section that stores a count value for the $(n+1)^{th}$ copy and beyond of said counter at the time of reading out the image data of the $(n+1)^{th}$ copy and beyond by said read out control section;

a comparison section that compares the count value stored in said first memory section and the count value stored in said second memory section; and, a control section that carries out error processing when there is an inequality in the comparison result in said comparison section, judging that an error has occurred in printing operation of the image forming apparatus.

Another preferred embodiment of the present invention is an image generation apparatus and has the following:

an image reading section that acquires image data by reading out images of an original document;

a storage section that stores the image data acquired by said image reading section;

a read out control section that repetitively reads out said image data from said storage section;

an image forming section that forms images for a specified number of copies based on the image data read out by said read out control section;

a first counter that counts for each of the predetermined pages the number of pixels included in the acquired image data at the time of acquiring said image data by said image reading section;

a first memory section that stores the count value of said first counter;

a second counter that counts for each of the predetermined number of pages the number of pixels included in the image data read out at the time of reading out said image data by said read out control section;

a second memory section that stores the count value of the second counter;

a comparison section that compares the count value stored in said first memory section and the count value stored in said second memory section; and a control section that carries out error processing when there is an inequality in the comparison result in said comparison section, judging that an error has occurred in a printing operation of the image forming apparatus.

Another preferred embodiment of the present invention is an image forming apparatus and has the following:

a storage section that stores image data;

a read out control section that repetitively reads out said image data from said storage section;

an image forming section that forms images for a specified number of copies based on the image data read out by said read out control section;

a first memory section that stores as a reference value the number of pixels for each of the predetermined number of pages of said image data;

a counter that counts the number of pixels included in each of the predetermined number of pages of the read out image data at the time of reading out said image data by said read out control section;

a second memory section that stores the count value counted by said counter;

a comparison section that compares the count value stored in said first memory section and the count value stored in said second memory section; and a control section that carries out error processing when there is an inequality in the comparison result in said comparison section, judging that an error has occurred in a printing operation of the image forming apparatus.

According to another preferred embodiment of the present invention, the number of pixels is stored at the time of reading out the image data, the number of pixels of the $n^{th}$ copy and the number of pixels of the $(n+1)^{th}$ copy and beyond are compared, and it becomes possible to detect errors in the printing process by judging whether or not the two are equal. In other words, since the two numbers of pixels are equal when the printing process is carried out correctly, it is possible to judge that there is some error such as incorrect pagination or missing pages if these two numbers of pixels are not equal to each other. Because of this, it becomes possible to detect easily incorrect pagination or missing pages during the printing process and to improve the quality of the printed matter.

According to another preferred embodiment of the present invention, the number of pixels stored at the time of acquiring the image data is compared with the number of pixels stored at the time of reading out the image data, and by judging whether these two are equal or not, it is possible to detect errors in the printing process. Because of this, in addition to the same effect as that of the preferred embodiments described above, particularly, even when printing the first copy, it is possible to detect easily errors in the printing process.

According to yet another preferred embodiment of the present invention, in case the number of pixels of one copy and the numbers of pixels of each page are known, by storing this number of pixels as a reference value, comparing this reference value with the number of pixels stored at the time of reading out the image data, and by judging whether these two numbers are equal or not, it is possible to detect errors in the printing process. Because of this, it is possible to obtain an effect similar to the preferred embodiments described above.

BRIEF DESCRIPTION OF THE DRAWINGS

These and other objects, advantages and features of the invention will become apparent from the following description thereof taken in conjunction with the accompanying drawings in which:

FIG. 6 is a diagram showing an example of the structure of a job data in the system memory 140.

FIG. 7 is a time chart showing the processing from starting the printing up to stopping the printing process after detecting an error.

DESCRIPTION OF THE PREFERRED EMBODIMENT

In the following, a preferred embodiment of the present invention is described in detail referring to FIG. 1 to FIG. 13.

In the present preferred embodiment, although the case of using a copying machine 1 as the image forming apparatus has been described, the image forming apparatus according to the present invention is not limited to this but can be any apparatus having the image forming function such as a printer or a facsimile, or an all-in-printer unit provided with the copying function, the printing function, the facsimile function, etc.

Figure 1:
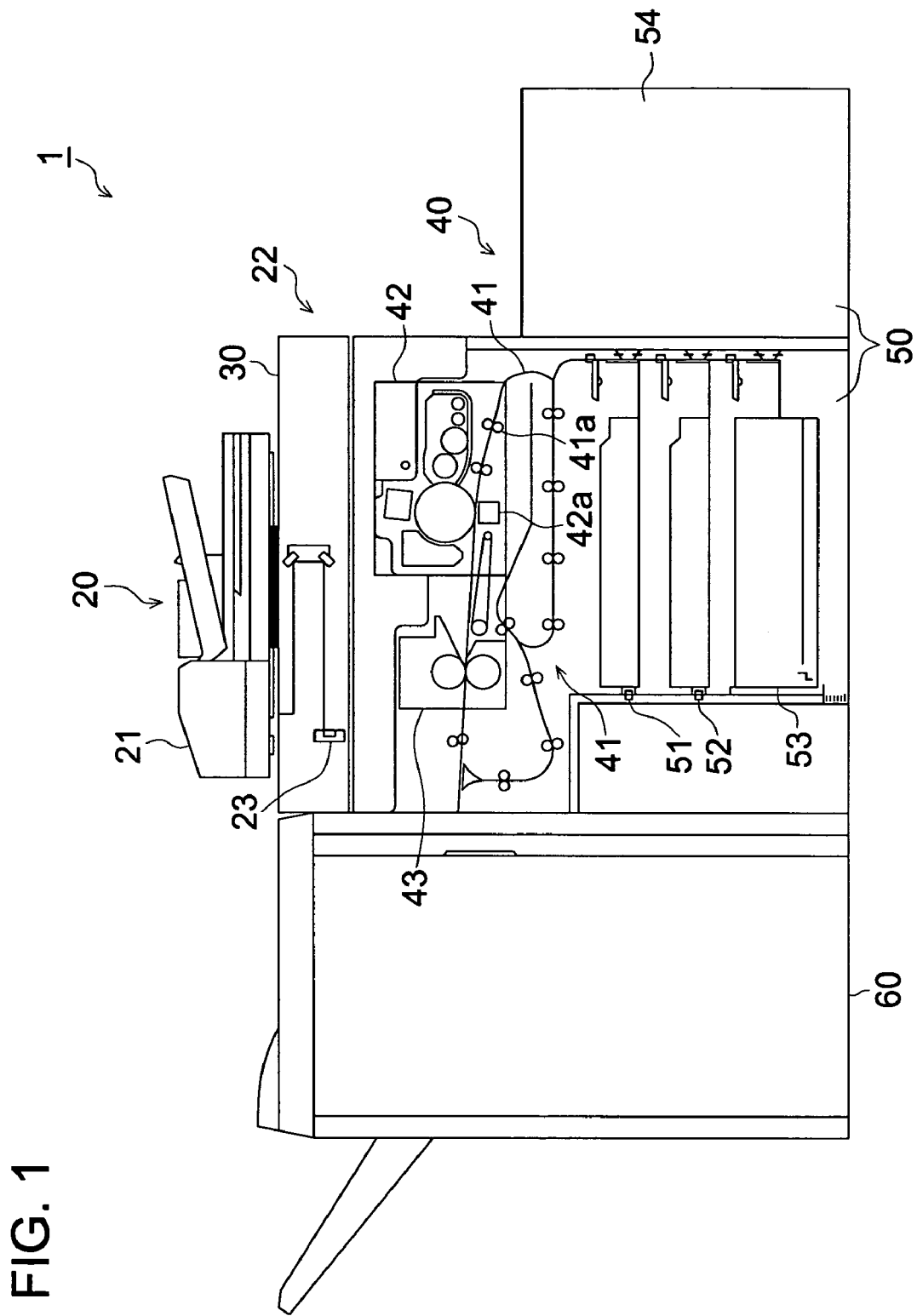
FIG. 1 is a diagram showing the configuration of a copying machine according to the present preferred embodiment.

As has been shown in FIG. 1, the copying machine 1 is configured to have an image reading section 20, an operation and display section 30 as the settings and input section or selection section, a printer section 40 as the image forming section, a sheet feeding unit 50, and a finishing unit 60.

The image reading section 20 is configured to have an ADF (Auto Document Feeder) 21 and a scanner section 22. Of these, the ADF 21 conveys the document placed on the document table. Further, the scanner section 22 is provided with a CCD (Charged Coupled Devices) image sensor 23, and the document conveyed by the ADF 21 is optically scanned via the contact glass or the document placed on the platen glass is optically scanned, the image recorded on the document is read out, and optoelectric conversion is made by the CCD image center 23 thereby obtaining the image data of the document.

Further, the image data of the document image read out by the image reading section 20 is suggested to various types of image processing by an overall control section (control means) 100 (see FIG. 5), and is output to the printer section 40 as the image data for printing.

Figure 2:
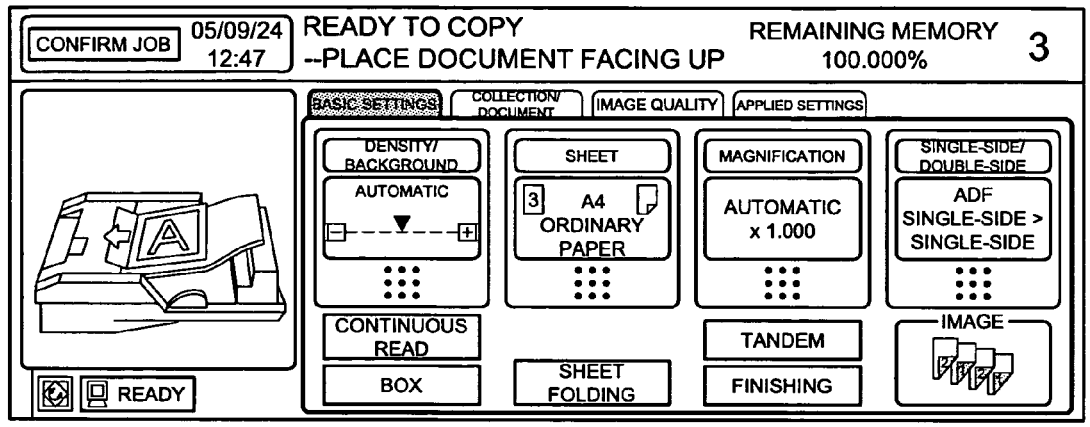
FIG. 2 is a diagram showing an example of a screen displayed in the LCD of the operation and display section.
Figure 3:
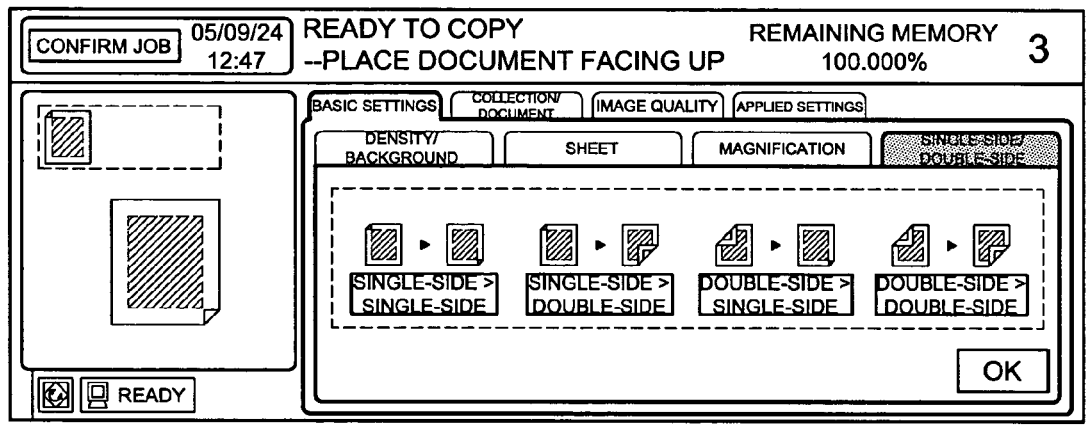
FIG. 3 is a diagram showing another example of a screen displayed in the LCD.
Figure 4:
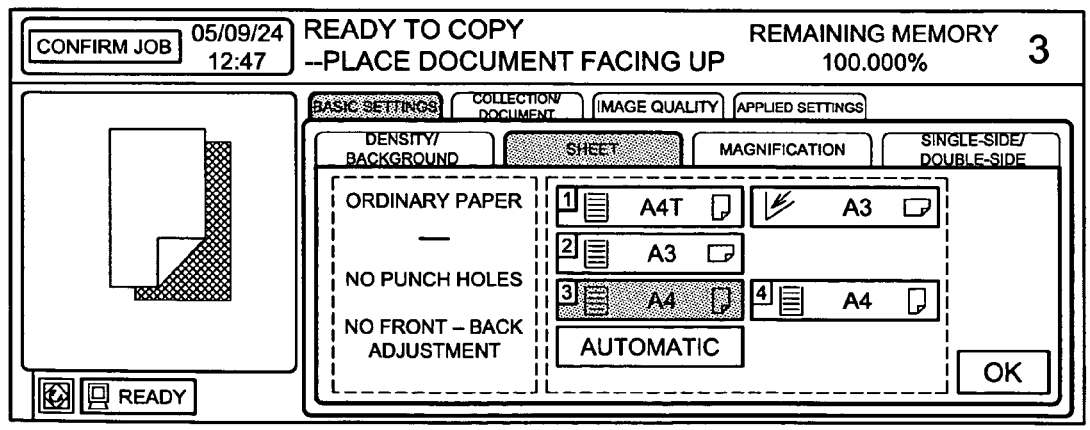
FIG. 4 is a diagram showing another example of a screen displayed in the LCD.
Figure 5:
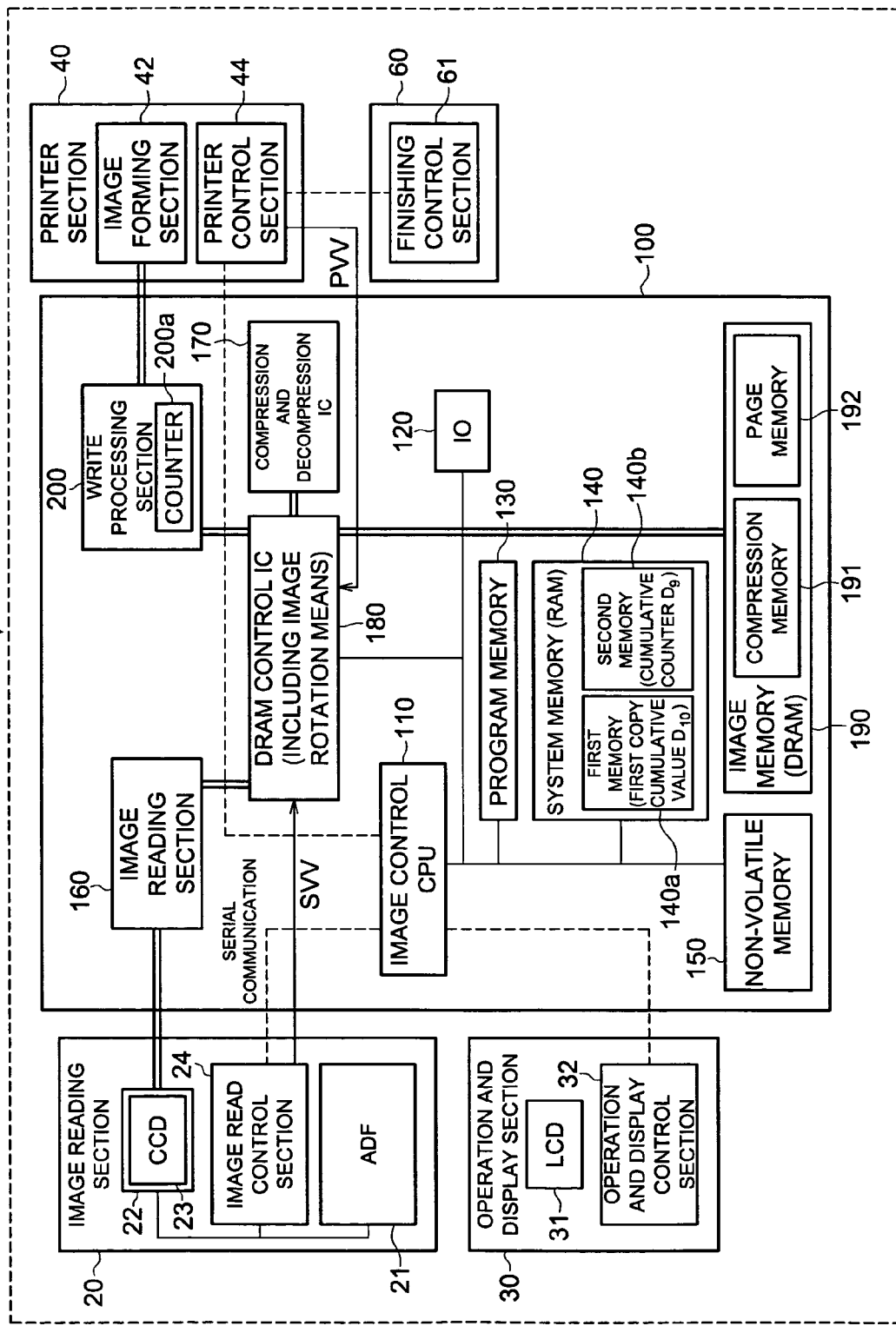
FIG. 5 is a functional block diagram showing the internal configuration of a copying machine.

The operation and display section 30 is provided with an LCD (Liquid Crystal Display) 31 (see FIG. 5). As is shown in FIG. 2 to FIG. 4, a touch panel that receives touch inputs is configured on the screen in the LCD 31 which displays various types of operation screens such as operation condition settings screen etc., or various types processing results. FIG. 2 is a diagram showing a screen for setting the basic operation conditions. If the single-side/double-side tab is pressed in this basic screen, the display changes to the screen (FIG. 3) of setting whether the document mode and the printing mode are single-side or double-side, and the tab of the paper is pressed, the display changes to the screen (FIG. 4) of selecting a paper size and the sheet feeding slot. Further, the operation and display section 30 is provided with the numeric buttons and various types of function keys such as a start key for instructing starting of printing, utility keys, etc, and receives the input from the user and outputs that input information to the overall control section (see FIG. 5)

The printer section 40 carries out the function of an image forming section that forms images on a recording medium. In other words, the printing section 40 is one that carries out image formation in the electro-photography method, and is configured to have a conveying mechanism 41 that conveys recording paper fed from the sheet feeding unit 50, an image forming section 42 that carries out image formation on the recording sheet, a fixing section 43 that fixes the toner image formed on the recording sheet.

Among these, the conveying mechanism 41 is configured to have various types of rollers such as the resist roller 41a, etc.

Further, the image forming section 42 is configured to have a photoreceptor drum which is the image carrier, a charging section that charges the photoreceptor drum, an exposure section with an LD (Laser Diode) that scans and exposes the surface of the photoreceptor drum based on the image data, a developing section that causes toner to get adhere to the photoreceptor drum, a transfer section 42a that transfers the toner image formed on the photoreceptor drum to the recording sheet and a cleaning section that cleans the residual toner on the photoreceptor drum.

Further, in the present preferred embodiment, although the printer section 40 is taken to be one that carries out image formation in the electro-photography method, the image forming method need not be limited to this but can also be the ink jet method, or the thermal transfer method, or the dot impact method.

The sheet feeding unit 50 is configured to have four sheet feeding trays 51 to 54. Further, in the present preferred embodiment, although four sheet feeding trays have been provided, it is not necessary to limit to this and their numbers is not particularly restricted. Each of the sheet feeding trays 51 to 54 can store recording sheets of different sizes and different types such as ordinary paper, backing paper, recycled paper, bond paper, etc.

The finishing unit 60 carries out various types of finishing operations on the recording sheet on which image formation has been done, such as sorting, punching (hole punching), stapling, center folding, cutting, etc., thereby preparing booklets or binding the books.

Next, referring to FIG. 5, the internal configuration of the copying machine 1 is described below.

As is shown in FIG. 5, the copying machine 1 is provided with an overall control section (control means) 100 and the overall control section (control means) 100 is configured to have an image control CPU 110, an I/O section 120, a program memory 130, a system memory (RAM) 140, a non-volatile memory 150, a read processing section 160, a compression and decompression IC 170, a DRAM (Dynamic Random Access Memory) control IC 180, an image memory 190, and a write processing section 200.

The image control CPU 110 is configured to have a CPU (Central Processing Unit), etc, reads out the specified program from among the system programs and various types of application programs stored in the program memory 130 and loads it in the system memory 140, and executes this processing program by the CPU. Further, the image control CPU 110 carries out communication with the image read control section 24, the operation and display control section 32, the printer control section 44, and the finishing process control section 61, and carries out transmission and reception of various types of signals. Because of this, the image reading section 20, the operation and display section 30, the printer section 40, and the finishing unit 60 connected to the image control CPU 110 are controlled centrally.

Further, the image control CPU 110, at the time that image data is read out from the image memory 190 by the DRAM control IC 180, compares the count value of the number of pixels of the $n^{th}$ copy (n is an integer more than 1 but less than the prescribed number of copies) stored in the first memory 140a of the system memory 140 with the count value of the number of pixels of the $(n+1)^{th}$ Copy stored in the second memory 140b, and judges whether the two are equal or not. As a result, in case they are not equal, error processing is carried out judging that an error has occurred in the printing process.

In the present preferred embodiment, at the time of printing the second and subsequent copies, at a prescribed timing, the cumulative value of the number of pixels of each copy beyond the second copy is compared with the cumulative value of the number of pixels of the first copy, a judgment is made as to whether they are equal or not, and if that result is that they are equal, it is judged that there was no errors such as incorrect pagination or missing pages, the printing process is continued, and an error processing is carried out if they are not equal.

Further, the image control CPU 110, at the time that image data is read out from the image memory 190 by the DRAM control IC 180, can also be configured to judge error in the printing process by comparing the count value of the number of pixels of that image data with a reference value. Here, the "reference value" is the value of the number of pixels of one copy or the number of pixels of each page entered beforehand in the operation and display section 30 as the reference for judging error in the printing process and stored in the system memory 140, when the number of pixels of one copy or the number of pixels of each page are known.

Further, error processing is the processing carried out by the image control CPU 110 when it is judged that an error such as incorrect pagination or missing pages has occurred, and includes the error notification processing of notifying the user about the error. In the present preferred embodiment, the error is being notified by displaying a message on the screen of the LCD 31. Further, the error processing need not be limited to this but the configuration can also be one in which the error is notified by an alert, etc. In addition, in the present preferred embodiment, as the error processing, the image formation operation of the copying machine 1 are stopped. Because of this, it is possible to prevent the generation of printed matter with incorrect pagination or missing pages.

The I/O section 120 carries out input and output of data between the image control CPU 110 and the control sections of different sections.

The program memory 130 is configured using a non-volatile memory such as semiconductor memory and stores various types of processing programs executed in the copying machine 1.

The system memory 140 is a memory for temporarily storing the programs read out from the program memory 130 and the data related to these programs, and information such as job data or parameters etc, and has working area for loading various types of programs and data.

Further, the system memory 140 of the present preferred embodiment is provided with a first memory 140a for storing the count value of the $n^{th}$ copy counted by the number of pixels counter 200a at the time of reading out the image data of the $n^{th}$ copy and a second memory 140b for storing the count value of the $(n+1)^{th}$ copy and beyond counted by the number of pixels counter 200a at the time of reading out the image data of the $(n+1)^{th}$ copy and beyond.

Further, when the number of pixels of one copy and the number of pixels of each page are known, it is also possible to store the reference value entered beforehand in the operation and display section 30 as the reference for judging error in the printing process in the first memory 140a of the system memory 140. In this case, the count value counted by the number of pixels counter 200a of the write processing section 200 s stored n the second memory 140b. Because of this, it is possible to detect incorrect pagination or missing pages even from the first copy.

An example of the job data stored in the system memory 140 is shown in FIG. 6.

As is shown in FIG. 6, the job data 141 is constructed to have the page common data for all document pages (page common data 141i) and the data for each document page (page-wise data 141ii).

The page common data 141i includes the different types of settings conditions set based on the instruction signals input from the operation and display section 30 and data indicating the operating status of the image forming operation and the finishing operations.

For example, the page common data 141i is constituted to have the set number of copies $D_1$ indicating the set number of copies input from the operation and display section 30, the sheet feed counter $D_2$ that indicates how many sheets were fed in this job and that is incremented by 1 every time a sheet is fed, the sheet discharge counter $D_3$ that indicates how many sheets were discharged in this job and that is incremented by 1 every time a sheet is discharged, the copy mode $D_4$ that indicates the surface of image forming, that is, whether double-sided printing is made from single-sided document, or single-sided printing is made from a double-sided document, etc., the selected tray $D_5$ indicating which of the sheet feeding trays 51 to 54 having the prescribed recording sheet is to be used, the number of images read out $D_6$ that indicates the total number of individual image data that has been read out and that is initialized to '1' at the time of starting the copying, the output page $D_7$ indicating the page that is to be output next, the number of copies output $D_8$ indicating the output of how many copies has been completed at present, the number of pixels cumulative counter $D_9$ indicating the number of pixels summed for each page by the number of pixels counter 200a of the write processing section 200, the first copy number of pixels cumulative value $D_{10}$ indicating the cumulative value of the number of pixels for the first copy, and the incorrect pagination flag $D_{11}$ that is set when the image control CPU 110 detects incorrect pagination, etc.

Further, in the present preferred embodiment, although the cumulative value of the number of pixels of the first copy is stored in the first copy number of pixels cumulative value $D_{10}$ of the page common data 141i in the system memory 140 at the time of completing the printing the first copy, it is also possible to have a configuration in which the cumulative number of pixels of each page of the first copy is stored.

Further, in the page-wise data 141ii, the individual image data corresponding to each page of the document that has been read in to which is appended the identification number (for example, page 1, page 2, . . . , page N) is stored.

The non-volatile memory 150 is configured using a flash memory, etc., and stores various types of programs and data in a rewriteable manner.

The read processing section 160 carries out various processing such as analog signal processing, A/D conversion processing, shading processing, etc., on the analog image signal input from the CCD image sensor of the image reading section 20 thereby generating the digital image data, and outputs the generated digital image data to the compression and decompression IC 170.

The compression and decompression IC 170 not only carries out compression processing on the digital image data input from the read processing section 160 but also carries out decompression processing on the compressed image data at the time of reading out the digital image data.

The DRAM control IC 180 carries out the function of as a read out section that repetitively reads out the image data for a prescribed number of copies from the image memory 190. Further, the DRAM control IC 180, following the instructions from the image control CPU 110, carries out control of the compression processing and decompression processing of the digital image data by the compression and decompression IC 170.

The image memory 190 functions as a storage section and is configured to have a compression memory 191 and a page memory 192 using DRAMs, etc. Among these, the compression memory 191 is the memory for storing compressed image data, and the page memory 192 is the memory for temporarily storing the uncompressed image data of the target of print output before the print output is made.

The write processing section 200 carries out the function as a write processing section that generates the print data for image formation based on the uncompressed image data input from the DRAM control IC 180 and outputs this print data to the image forming section 42 of the printer section 40.

Further, the write processing section 200 of the present preferred embodiment is provided with a number of pixels counter 200a that counts for each predetermined pages the number of pixels included in the image data.

Here, although the word "predetermined pages" in the present preferred embodiment means all the three pages in which the image data is present, it is also possible that the "predetermined pages" is only one page, and in this case the count value for each page is stored in the first memory 140a of the system memory 140. Further, when judging errors in the printing process by comparing with the reference value, it is good to store the reference value for each page in the first memory 140a of the system memory 140.

Next, the internal configurations of the image reading section 20, the operation and display section 30, the printer section 40, and the finishing unit 60 connected to the image control CPU 110 of the overall control section (control means) 100 are described in the following.

The image reading section 20 is configured to have an ADF 21, a scanner section 22 having a CCD image sensor 23, and the image reading control section 24.

The image reading control section 24, following instructions from the image control CPU 110, controls the scanner section 22 to carry out optical scanning of the document surface, and outputs the read out analog image signal to the read processing section 160.

In addition, the image reading control section 24, according to the read operation of the image reading section 20, outputs the image read out signal (SVV) to the DRAM control IC 180. Based on this image read out signal, the DRAM control IC 180 compresses the digital data from the read processing section 160 using the compression and decompression IC 170 and stores it in the compression memory 191 of the image memory 190.

The operation and display section 30 is configured to have an LCD 31 and an operation and display control section 32. The operation and display control section 32, following instructions from the image control CPU 110, not only displays various types of operation screens and different types of processing results in the LCD 31, but also accepts inputs from the touch panel on the display screens and takes in the input signals. In addition, the operation and display control section 32 outputs to the image control CPU 110 the operation signals due to operations of the touch panel or the different function keys of the LCD 31.

The printer section 40 is provided with an image forming section 42 and a printer control section 44.

Among these, the printer control section 44, following instructions from the image control CPU 110, controls the operations of the different parts of the printer section 40, and makes the image forming section 42, etc. carry out image formation on the recording sheet based on the image data input from the write processing section 200.

Further, the printer control section 44 carries out the sheet feeding operation from the sheet feeding trays 51 to 54 according to the first sheet feed signal, and carries out the second sheet feeding operation after the first sheet has reached the resist roller 41a. In synchronization with this second sheet feeding operation, an image write signal (PVV) is output to the DRAM control IC 180. Based on this image write signal, the DRAM control IC 180 carries out the decompression processing of the image data. Here, the image data read out from the compression memory is subjected to decompression processing and is sent to the image forming section 42 via the write processing section 200.

The finishing unit 60 is configured to have various types of finishing operation sections not shown in the figure and a finishing control section 61. The finishing control section 61, following instructions from the image control CPU 110 sent via the printer control section 44, controls the different finishing operation sections so that different finishing operations are made on the recording sheet on which image formation has been done and which has been output by the printer section 40.

Figure 8:
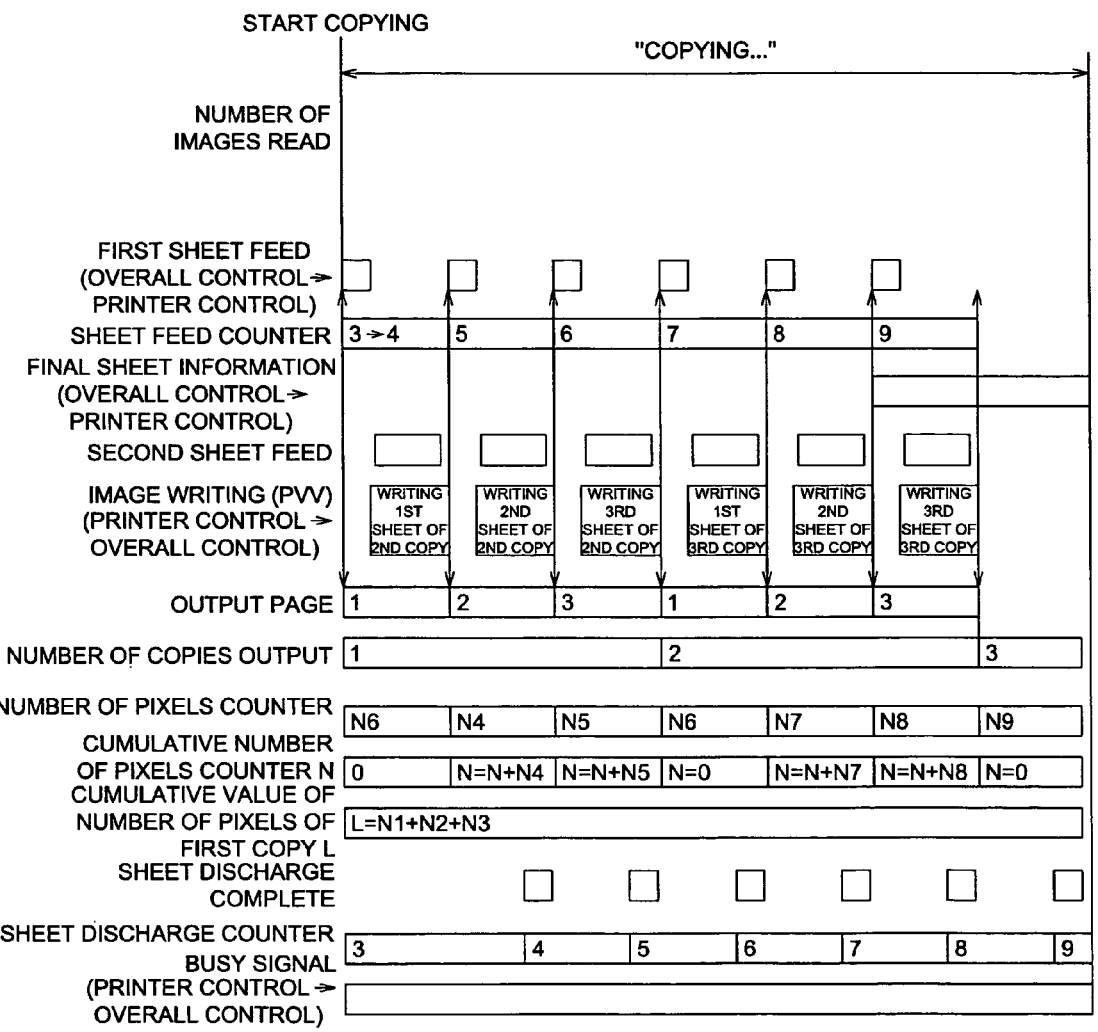
FIG. 8 is a time chart showing the recovery process after stopping the printing.

Next, the operations of the copying machine 1 are described here referring to the time charts of FIG. 7 and FIG. 8.

The copying machine of the present invention is presumed to carry out printing of several copies, and in the present preferred embodiment, description is given for the case of carrying out single-sided copying of three sets of three sheets of a single-sided document.

When the number of copies is set as 3 in the operation and display section 30, the set number of copies $D_1$ becomes "3" in the page common data 141i of the job data 141. Also, even the details of other settings are stored in the system memory 140 as the job data 141.

Further, if the reference value for judging errors in the printing process is input in the operation and display section, this reference value is stored in the first memory 140a of the system memory 140.

As is shown in FIG. 7, three sheets of the document are read out by read operation of the image reading section 20, and in accordance with this operation image processing is done by the read processing section 160, and the image read control section 24 outputs the image read signal (SVV) to the DRAM control IC 180.

Next, the DRAM control IC 180 compresses the image data output from the read processing section 160 under the control of the compression and decompression IC 170, and stored the data in the compression memory 191 of the image memory 190.

Next, when the reading operation is completed, the image control CPU 110 outputs the first sheet feeding signal to the printer control section 44, the printer control section 44 conveys the recording medium from the sheet feeding trays 51 to 54 using the conveying mechanism 41 up to the resist roller 41a. At this time, every time a sheet feeding signal is output, the sheet feeding counter $D_2$ in the page common data 141i stored in the system memory 140 is incremented by 1.

Next, the printer control section 44 starts the resist roller 41a and conveys the recording medium from the resist roller 41a to the transfer section 42a.

At this time, the printer control section 44 outputs the image write signal (PVV) to the DRAM control IC 180 when the sensor, not shown in the figure, placed on the downstream side of the resist roller 41a detects the sheet.

Next, the DRAM control IC 180 reads out the compressed image data from the compression memory 191, carries out decompression processing using the compression and decompression IC 170, and sends the uncompressed image data to the write processing section 200.

The write processing section 200 generates the image data for printing in order carry out image formation based on this uncompressed image data (write processing), and outputs it to the image forming section 42 of the printer section 40.

At this time, the number of pixels counter 200a provided in the write processing section 200 counts for each of the predetermined pages the number of pixels included in the image data read out by the image reading section 20. In other words, the number of pixels is counted for each page of the document by the number of pixels counter 200a, and the number of pixels N is summed for each copy by the image control CPU 110.

For example, in FIG. 7, the number pixels N in the initial condition is taken as 0, and the number of pixels of the first page is indicated as $N_1$, the number of pixels of the second page as $N_2$, and the number of pixels for the cumulative $m^{th}$ page is indicated as $N_m$. Therefore, the cumulative value of the number of pixels at the point when the image of the first page has been written is $N=N+N_1$ (that is, $N=N_1$), the cumulative value of the number of pixels at the point when the image of the second page has been written is $N=N+N_2$ (that is, $N=N_1+N_2$), and the cumulative value of the number of pixels at the point when the image of the third page has been written is $N=N+N_3$ (that is, $N=N_1+N_2+N_3$), and thereafter the number of pixels will be reset and becomes N=0.

Further, the cumulative value $N=N_1+N_2+N_3$ of the number of pixels of the first copy at the time of the image write processing of the first copy it taken as a prescribed value L.

Here, although in the present preferred embodiment, the counting was done for every three pages which constitute all the pages of image data, it is also possible to count for every page, and in that case the count value for each page is stored in the first memory 140a of the system memory 140. In addition, in case the judgment of error in the printing process is judged by comparing with the reference value, the reference value for each page is stored in the first memory 140a of the system memory 140.

Next, at the time that the image date of the $n^{th}$ copy is read out, the first memory 140a provided in the system memory 140 stores the count value of the $n^{th}$ copy counted by the number of pixels counter 200a, and also, when the image data of the $(n+1)^{th}$ copy and beyond is read out, the second memory 140b stores the count value of the $(n+1)^{th}$ copy and beyond counted by the number of pixels counter 200a.

Next, when the printer section 40 has carried out image forming, the finishing unit 60 carries out the finishing operations such as punching, stapling, etc., and discharges the booklet to the prescribed discharge tray. At this time, every time one sheet is discharged, the sheet discharge counter $D_3$ of the page common data 141i stored in the system memory 140 is incremented by 1.

Next, when the writing operation of the second copy is completed after printing the first copy, the image control CPU 110 compares the cumulative number of pixels N of the second copy with the cumulative value L of the number of pixels of the first copy, and judges whether the two numbers of pixels are equal to each other or not. Next, if the cumulative values of the numbers of pixels are equal to each other, it is judged that there was no error such as incorrect pagination or missing pages, and the operation moves on to the printing of the third copy. In addition, even when the printing of the third copy is completed, a similar comparison and judgment are made.

Further, the image control CPU 110, at the time that the image data is read out from the image memory 190 by the DRAM control IC 180, can judge for errors in the printing process by comparing the count value of the number of pixels of the read out image data with the reference value.

In this manner, when the printing of the third sheet of the third copy has been completed, the image control CPU 110 terminates the printing process by transmitting the final sheet information to the printer control section 44.

On the other hand, if the cumulative values are not equal to each other, it is judged that there was an error in the printing process, the printing process is stopped by transmitting the final sheet information to the printer control section 44, recovery processing is done by carrying out error processing, and then the printing process is continued.

FIG. 8 is a time chart showing the recovery process after the image control CPU 110 has detected an error in the middle of printing the second copy and has stopped the printing. When an error is detected in the middle of printing the second copy, after stopping the printing process, the printing process is restarted from the first page of the second copy.

Figure 9:
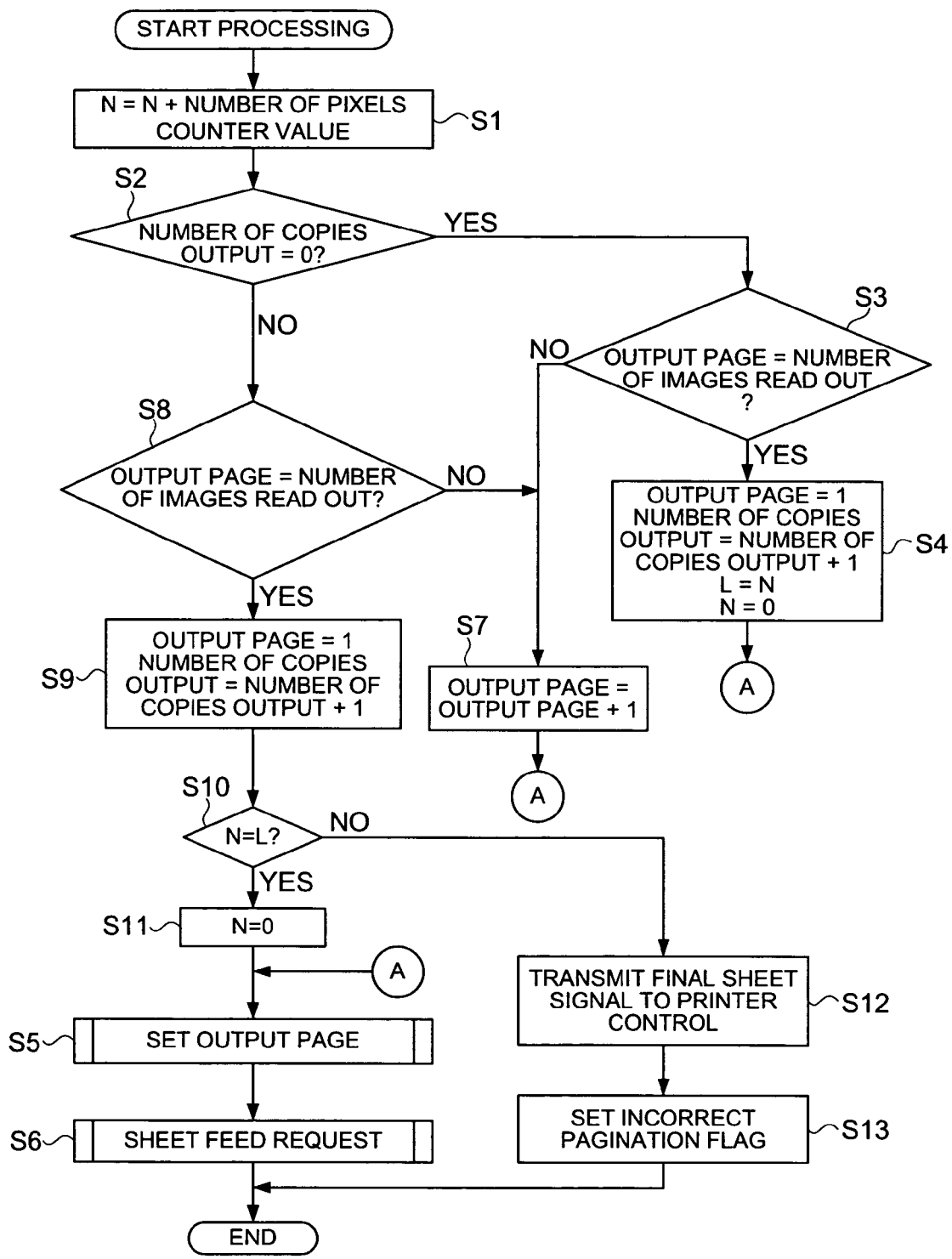
FIG. 9 is a flow chart showing the processing up to stopping the printing process after detecting an error during writing an image.

FIG. 9 is a flow chart showing the processing when the image control CPU 110 has detected an error at the point of time at which the writing process has ended (the point of time at which PVV has changed from the ON state to the OFF state) until the printing process is stopped.

When the processing is started, the image control CPU 110 adds the count value of the number of pixels counter 200a of the write processing section 200 to the cumulative value N of the number of pixels up to that point (Step 1).

Next, depending on whether or not the number of copies output $D_8$ of the page common data 141i is "0", the image control CPU 110 judges whether the copy being printed currently is the first copy or the second or subsequent copy (Step S2).

Next, when it is judged that the number of copies output $D_8$ is "0" and the current page of the first copy, a judgment is made as to whether or not the output page $D_7$ to be output next is the same as the number of images read out $D_6$, that is, a judgment is made as to whether or not the currently printed page is the third page which is the border page of the first copy (Step S3).

Next, if the currently printed page is the third page which is the border page of the first copy, the output page $D_7$ is set to 1, the number of copies output $D_8$ is set to 1 in the page common data 141i, the cumulative value L=N of the number of pixels of the first copy is latched, and the cumulative value N of the number of pixels per copy is reset to N=0 (Step S4).

Next, the output page is set (Step S5), a sheet feed request is made (Step S6), and the processing is ended.

Further, if the currently printed page is the first or the second page and not the border page of the first copy, the output page $D_7$ is incremented by 1 (Step S7), the output page is set (Step S5), a sheet feed request is made (Step S6), and the processing is ended.

On the other hand, even when it is judged that the number of copies output $D_8$ of the page common data 141i is not equal to '0' and that the copy being printed currently is the second or the subsequent copy, a judgment is made as to whether or not the output page $D_7$ to be output next is the same as the number of images read out $D_6$ (Step S8).

Next, if it is the third page which is the border page of the copy being printed currently, the output page $D_7$ to be output next is made 1 in the page common data 141i, and the number of copies output $D_8$ is incremented by 1 (Step S9).

Next, the image control CPU 110 compares the cumulative value of the number of pixels of the second and subsequent copy with the cumulative value of the number of pixels of the first copy (Step S10).

Next, when the cumulative value of the number of pixels of the second and subsequent copy is the same as the cumulative value of the number of pixels of the first copy, it is judged that there was no error such as incorrect pagination or missing pages, the cumulative value N of the number of pixels per page N is reset to 0 (Step S11). Next, the output page is set (Step S5), a sheet feed request is made (Step S6), and the processing is ended.

On the other hand, when the cumulative value of the number of pixels of the second and subsequent copy is not equal to the cumulative value of the number of pixels of the first copy, it is judged that there was some error such as incorrect pagination or missing pages, the final sheet signal is transmitted to the printer control section 44 (Step S12).

Figure 12:
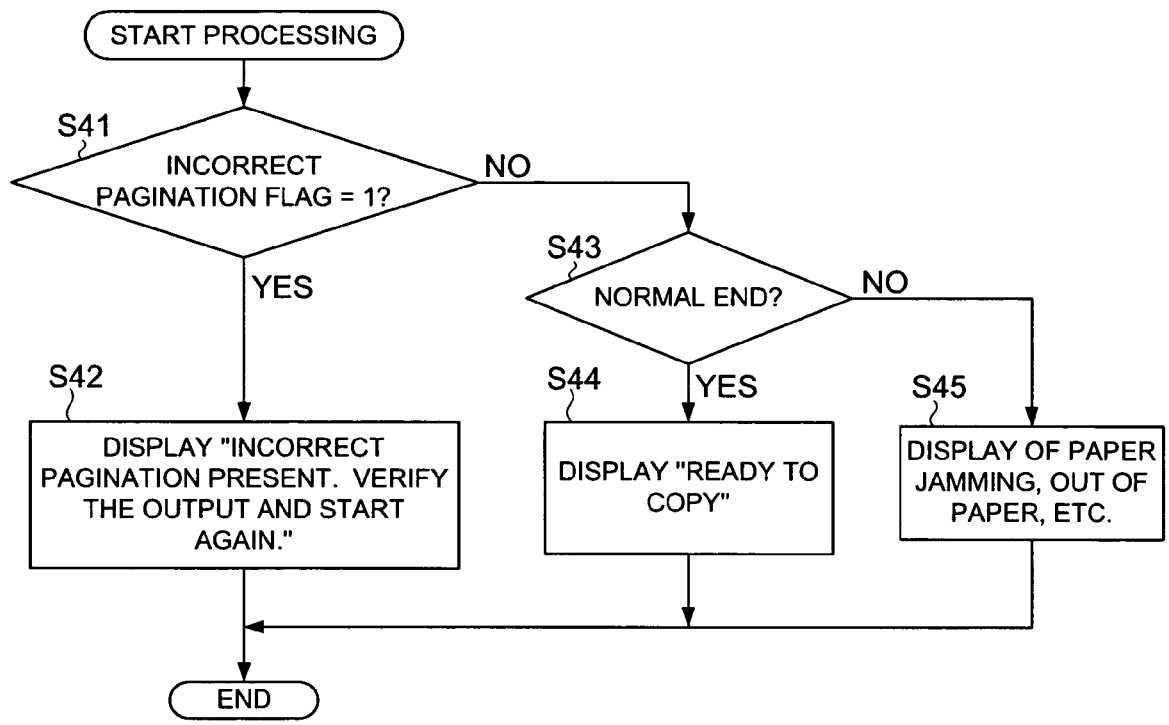
FIG. 12 is a flow chart showing the notification process.
Figure 13:
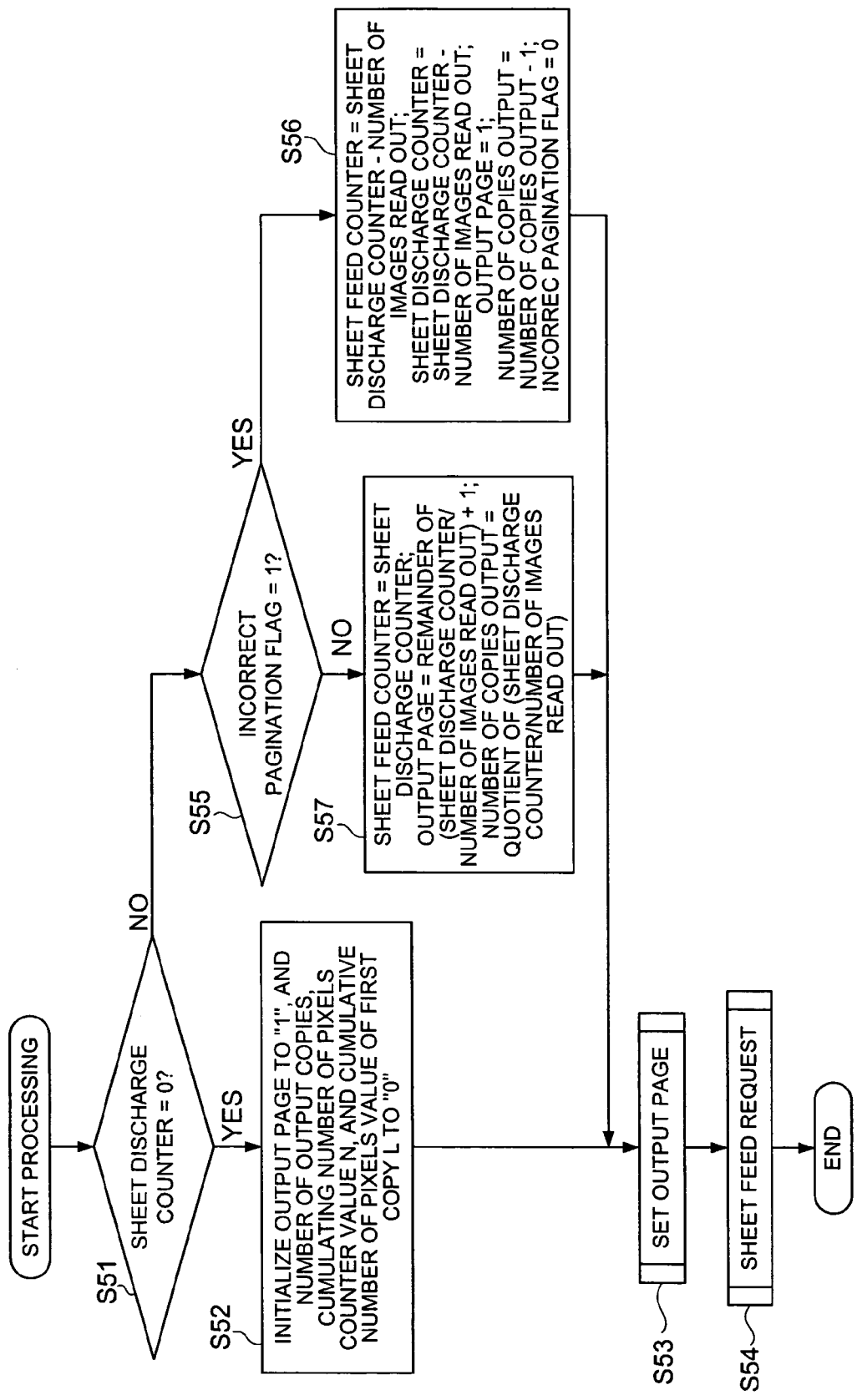
FIG. 13 is a flow chart showing the job starting process.

In addition, the incorrect pagination flag $D_{11}$ in the page common data 141i is set to 1 (Step S13), and the error notification processing is made as shown in FIG. 12 when the operation has stopped.

Here, the output page setting process of Step S5, the sheet feed requesting process of Step S6, and the notification processing are described below.

Figure 10:
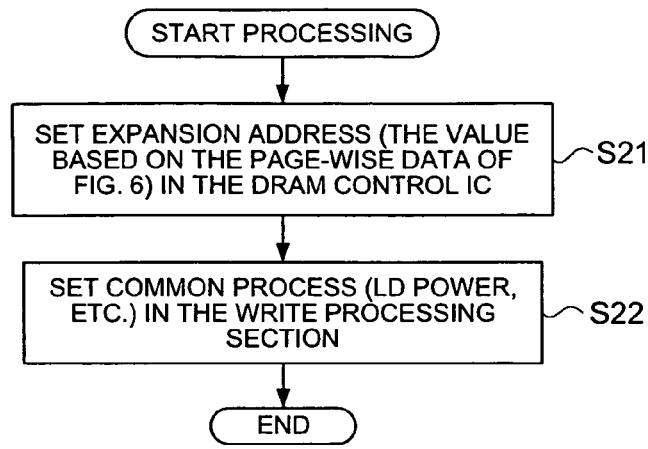
FIG. 10 is a flow chart showing the output page setting process.

FIG. 10 is a flow chart showing the output page setting process.

When the output page setting process is started, the image control CPU 110, using the output page $D_7$ of the page common data 141i, sets the expansion address in the DRAM control IC 180 (Step S21). This expansion address is stored for each page data corresponding to the output page $D_7$, and indicates the destination of storing the image data in the image memory 190. The address is based on the page-wise data as shown in FIG. 6.

Next, the image control CPU 110 sets in the write processing section 200 the data related to image processing common to all the pages and all the copies, such as the LD power value of the exposure section of the image forming section 42 (Step S22), and ends the output page setting process.

Figure 11:
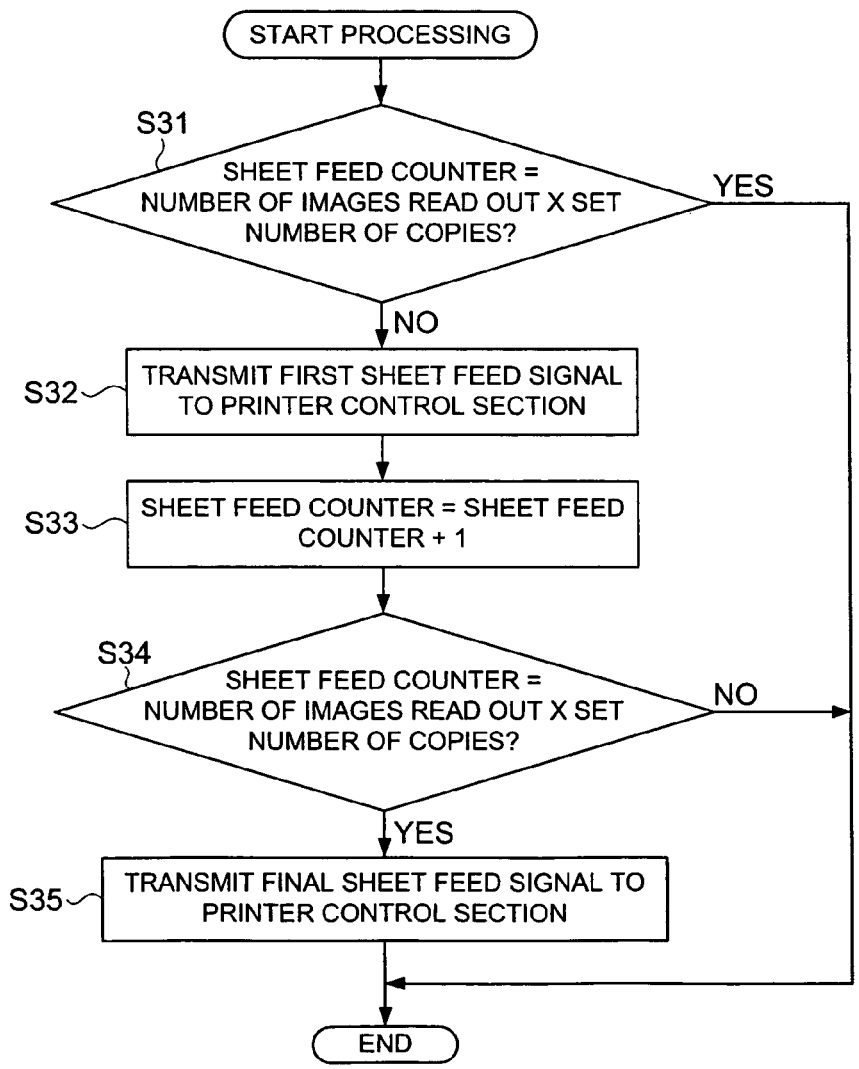
FIG. 11 is a flow chart showing the sheet feed requesting process.

FIG. 11 is a flow chart showing the sheet feed requesting process.

When the sheet feed requesting process is started, the image control CPU 110 judges whether or not the sheet feed counter $D_2$ of the page common data $141i$ in the system memory $140$ is equal to the product of the set number of copies $D_1 \times$ the number of images read out $D_6$ (Step S31). In other words, a judgment is made as to whether or not the necessary numbers of sheets have been fed according to the number of copies printed.

Next, if the sheet feed counter $D_2$=set number of copies $D_1 \times$ number of images read out $D_6$, the sheet feed requesting process is terminated.

On the other hand, if the sheet feed counter $D_2 \neq$ set number of copies $D_1 \times$ number of images read out $D_6$, taking that the necessary number of sheets has not been fed, the image control CPU $110$ outputs the first sheet feed signal to the printer control section $44$ (Step S32). In addition, the sheet feed counter $D_2$ in the page common data $141i$ is incremented by 1 (Step S33).

Next, the image control CPU $110$ again judges whether or not the sheet feed counter $D_2$ is equal to the product of the set number of copies $D_1 \times$ the number of images read out $D_6$ (Step S34).

Next, if the sheet feed counter $D_2$=set number of copies $D_1 \times$ number of images read out $D_6$, the final sheet signal is transmitted to the printer control section $44$ (Step S35), and the sheet feed requesting process is terminated.

On the other hand, if the sheet feed counter $D_2 \neq$ set number of copies $D_1 \times$ number of images read out $D_6$, the sheet feed requesting process is terminated.

FIG. $12$ is a flow chart showing notification process executed at the time the busy signal posted from the printer control section $44$ changes from ON to OFF.

When the notification process is started, the image control CPU $110$ judges whether or not the incorrect pagination flag $D_{11}$ of the page common data $141i$ in the system memory $140$ has become 1 (Step S41). Next, if the incorrect pagination flag $D_{11}$ has become 1, taking that there was some error in the printing process, the error is notified to the user by displaying a message on the screen of the LCD $31$ (Step S42). As this message, for example, it is possible to display a message such as "Incorrect pagination present. Verify the output and start again.", etc.

On the other hand, if the incorrect pagination flag $D_{11}$ has not become 1, a judgment is made as to whether or not the printing ended normally (Step S43). If the printing has ended normally, this fact is displayed (Step S44). For example, it is possible to display a message such as "Ready to copy", etc.

On the other hand, if the printing did not end normally due to a reason other than incorrect pagination or missing pages, for example, due to paper jamming or the paper being exhausted, this message is displayed (Step S45). For example, it is possible to display a message such as "Paper jammed" or "Out of paper", etc.

In this manner, when the respective message is displayed, the notification process is terminated.

Next, the recovery process is described below.

FIG. $13$ is a flow chart showing the job starting process including the restarting of a job (the recovery process after stopping the printing process).

After the image control CPU $110$ has stopped the printing after detecting and error, when the recovery process is started, to begin with, it judges whether the sheet discharge counter $D_3$ in the page common data $141i$ in the system memory $140$ is 0 or not (Step S51).

Next, if the sheet discharge counter $D_3$=0 (at the time of starting a job), the output page $D_7$ of the page common data $141i$ in the system memory $140$ is initialized to 1, and the number of copies output $D_8$, the cumulative number of pixels counter $D_9$, and the cumulative number of pixels counter for the first copy $D_{10}$ are respectively initialized to 0 (Step S52).

Next, the output page is set (Step S53), a sheet feed request is made (Step S54), and the processing is terminated.

On the other hand, if the sheet discharge counter $D_3$ is not equal to 0 (at the time of restarting a job), a judgment is made as to whether or not the incorrect pagination flag $D_{11}$ of the page common data $141i$ has become 1 (Step S55).

Next, if the incorrect pagination flag $D_{11}$ has become 1, the output page $D_7$ is initialized as 1 taking the sheet feed counter $D_2$ of the page common data $141i$=sheet discharge counter $D_3$−number of read out images $D_6$, and sheet discharge counter $D_3$=sheet discharge counter $D_3$−number of read out images $D_6$, and the number of output copies $D_8$ is made equal to (number of output copies $D_8$−1), and the incorrect pagination flag $D_{11}$ is reset to 0 (Step S56).

For example, as is shown in the time chart of FIG. $8$, when restarting after having stopped the printing due to the detection of an error in the middle of the second copy, the sheet discharge counter will be $D_3$=6−3=3, the output page $D_7$=1, and the number of output copies $D_8$=2−1=1.

Next, the output page is set (Step S53), a sheet feed request is made (Step S54), and the processing is terminated.

On the other hand, if the incorrect pagination flag $D_{11}$ has not become 1, since the printing would have stopped due to a reason other than incorrect pagination or missing pages, the sheet feed counter $D_2$ is made equal to the sheet discharge counter $D_3$, the output page $D_7$ is made equal to the remainder+1 of the division of the sheet discharge counter $D_3$/number of read out images $D_6$, and the number of copies output $D_8$ is made equal to the quotient of sheet discharge counter $D_3$/number of read out images $D_6$ (Step S57).

Next, the output page is set (Step S53), a sheet feed request is made (Step S54), and the processing is terminated.

According to the copying machine $1$ of the present preferred embodiment described above, by storing the number of pixels at the time of reading the image data, comparing the number of pixels of the $n^{th}$ copy with the number of pixels of the $(n+1)^{th}$ and subsequent copies, and by judging whether these two are equal to each other or not, it is possible to detect errors in the printing process. In other words, since these two numbers of pixels are equal when the printing process has been carried out normally, if the two numbers of pixels are not equal, it is possible to judge that some error has occurred such as incorrect pagination or missing pages. Because of this, it becomes possible to detect easily incorrect pagination or missing pages in the middle of the printing process, and hence it is possible to improve the quality of the printed matter.

Further, by comparing the number of pixels of the first copy with the number of pixels of the second and subsequent copies and by judging whether the two numbers of pixels are equal to each other or not, it becomes possible to detect errors in the printing process.

Further, if the number of pixels of one copy or the numbers of pixels of each page are known, by storing this number of pixels as a reference value, comparing this reference value with the number of pixels stored at the time of reading out the image data, and by judging whether these two numbers are equal or not, it is possible to detect errors in the printing process.

Further, by comparing the comparing the number of pixels summer over all the pages of the image data, and by judging whether the numbers of pixels are equal or not, it is possible to detect errors in the printing process in the case when there is any incorrect pagination or missing page at any page of the image data.

Further, by comparing the cumulative number of pixels for a predetermined page among the image data, and by judging whether or not they are equal to each other, if there is any error such as incorrect pagination or missing page at a prescribed page of the image data, it is possible to detect as an error in the printing process.

In addition, by comparing the number of pixels for each page with the reference value, and by judging whether they are equal to each other or not, it is possible to detect errors in the printing process for each page.

Furthermore, by carrying out error processing at the time of detection of an error, it is possible for the user of the image forming apparatus to grasp easily errors in the printing process such as incorrect pagination or missing pages.

Further, although in the present invention a copying machine 1 was used as an example of the means for realizing the present invention, the present invention can also be configured as a program that realizes the functions of the different configuration parts provided in the copying machine 1.

Further, the detailed configurations and the detailed operations of the different parts of the apparatus constituting the copying machine according to the present preferred embodiment can be modified appropriately without deviating from the purpose and intent of the present invention.

Modified Example of a Preferred Embodiment

Figure 14:
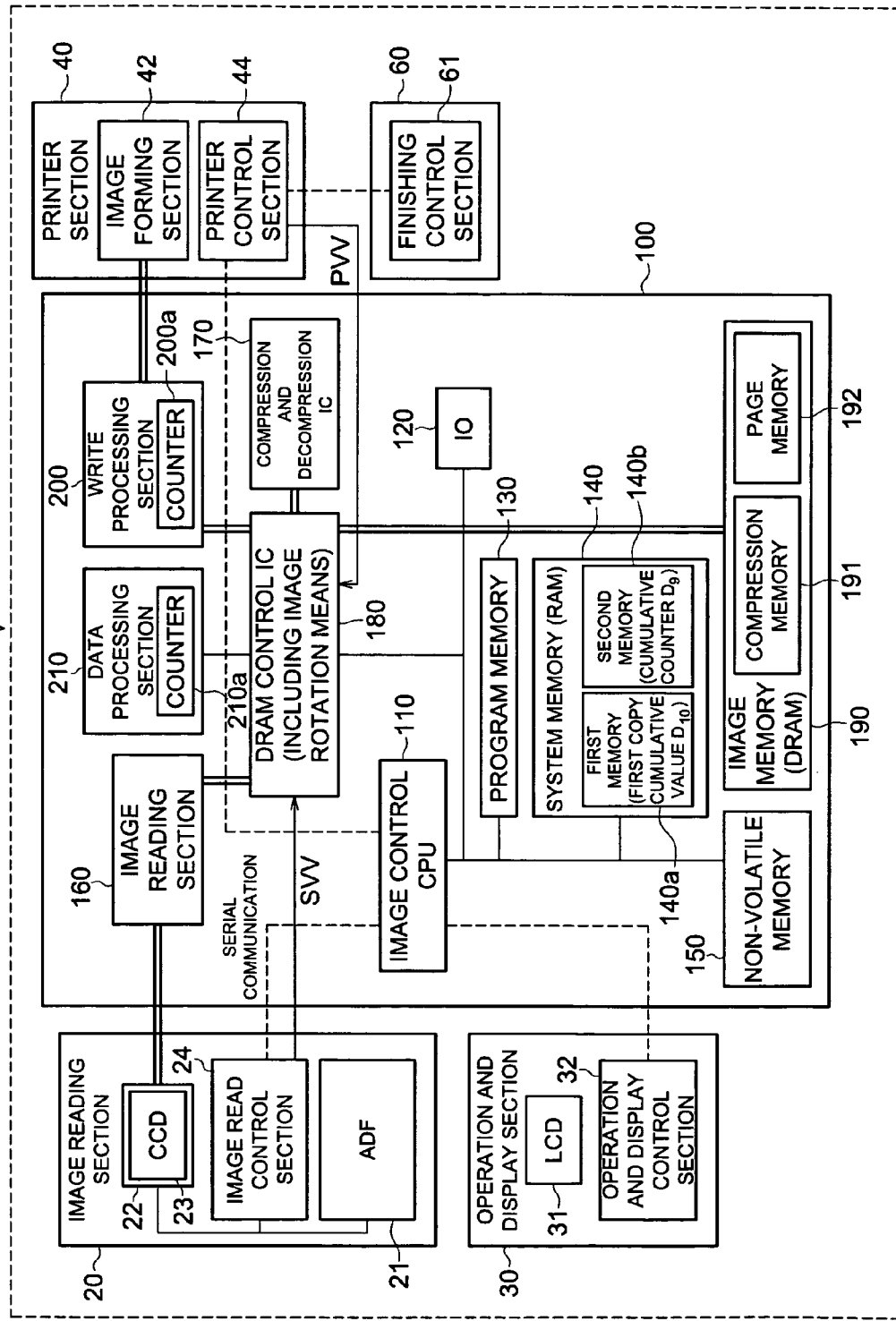
FIG. 14 is a diagram showing the configuration of a copying machine in a modified example of the present preferred embodiment.

Next, a modified example of the above preferred embodiment is described below referring to FIG. 14.

However, the constituent elements similar to those of the above preferred embodiment are assigned the same symbols and their explanations have been omitted in the following.

In the copying machine 1 according to the present modified example, a data processing section 210 has been connected to the DRAM control IC 180. This data processing section 210 is provided with a number of pixels counter 210a that counts the number of pixels for each page included in the image data read in by the image reading section 20 and input to the DRAM control IC 180 via the read processing section 160. Further, the count value counted by the number of pixels counter 210a is output to the DRAM controller IC 180.

Further, the DRAM controller IC 180 according to the present modified example outputs the count value input from the data processing section 210 to the system memory 140 via the image control CPU 110.

In addition, the system memory 140 of the present modified example stores the count value counted by the number of pixels counter 210a of the data processing section 210 in the first memory 140a, and the count value counted by the number of pixels counter 200a of the write processing section 200 is stored in the second memory 140b.

Further, the image control CPU 110 of the present modified example compares the count value of the number pixels at the time of reading out the image data stored in the first memory 140a with the count value of the number of pixels stored in the second memory 140b at the time of reading out the image data, and judges if the two values are equal to each other or not. As a result of this comparison, if the two numbers of pixels are not equal to each other, it judges that an error has occurred during the printing process and error processing is carried out.

Next, the operations of the copying machine 1 are described below.

When the image data is read out by the image reading section 20 and has been input to the DRAM controller IC 180 via the read processing section 160, the number of pixels of included in this image data is output to the DRAM controller IC 180 by the number of pixels counter 210a of the data processing section 210 as the count for each of the predetermined number of pages.

Next, the DRAM control IC 180 outputs the count value counted by the number of pixels counter 210a to the system memory 140 via the image control CPU 110. As a result of this, the count value counted by the number of pixels counter 210a is stored in the first memory 140a of the system memory 140.

Subsequently, when the write processing section 200 starts the write processing of the image, the number of pixels counter 200a counts for each predetermined number of pages the number of pixels included in the image data read out by the image reading section 20.

Next, the DRAM control IC 180 outputs the count value counted by the number of pixels counter 200a to the system memory 140 via the image control CPU 110. As a result, the count value counted by the number of pixels counter 200a is stored in the second memory 140b in the system memory 140.

Next, the image control CPU 110 compares the count value of the number of pixels at the time of reading the image data and stored in the first memory 140a with the count value of the number of pixels at the time of reading out the image data stored in the second memory 140b, and judges if the two values are equal to each other. As a result of this, if there is any inequality between these two numbers of pixels, it is judged that there is some error in the printing process and the error process is executed.

As has been described above, in the copying machine 1 according to the present modified example, by comparing the number of pixels stored at the time of reading out the image data with the number of pixels stored at the time of reading the image data from the image memory for printing, and by judging whether the two are equal to each other or not, it is possible to detect errors in the printing process. Because of this, particularly, even at the time of printing the first copy, it is possible to detect easily errors in the printing process.

As has been explained in detail above, according to the image processing apparatus or program according to the present invention, it is possible to detect easily incorrect pagination or missing pages during the printing process, and to improve the quality of the printed matter.

What is claimed is:

1. An image forming apparatus, comprising:
a storage section that stores image data;
a read out control section that repetitively reads out said image data from said storage section for a specified number of copies;
an image forming section that forms images for the specified number of copies based on the image data read out by said read out control section;
a counter that counts for each of the specified number of copies the number of pixels included in the read out image data at the time of reading out said image data by said read out control section;
a first memory section that stores a count value for the $n^{th}$ copy counted by said counter at the time of reading out the image data of the $n^{th}$ copy (where n is an integer equal to 1 or more but less than the specified number of copies) by said read out control section;
a second memory section that stores a count value for the $(n+1)^{th}$ copy and beyond of said counter at the time of reading out the image data of the $(n+1)^{th}$ copy and beyond by said read out control section;
a comparison section that compares the count value for the $n^{th}$ copy stored in said first memory section and the count value for the $(n+1)^{th}$ copy stored in said second memory section when the writing operation for a predetermined number of pages of the $(n+1)^{th}$ copy has been completed; and, a control section that carries out error processing when there is an inequality in the comparison result in said comparison section, judging that an error has occurred in printing operation of the image forming apparatus.

2. The image forming apparatus according to claim 1, wherein n=1.

3. The image forming apparatus according to claim 1, wherein a predetermined number of pages is a number of all pages of the image data.

4. The image forming apparatus according to claim 1, wherein a predetermined number of pages is 1 and the first memory section stores a count value for each page.

5. The image forming apparatus according to claim 1, wherein the error processing includes an error notification processing of notifying the user about the error.

6. An image forming apparatus comprising:
a storage section that stores image data;
a read out control section that repetitively reads out said image data from said storage section;
an image forming section that forms images for a specified number of copies based on the image data read out by said read out control section;
a first memory section that stores as a reference value the number of pixels for each of the predetermined number of pages of said image data, wherein the number of pixels is entered by an operator beforehand;
a counter that counts the number of pixels included in each of the predetermined number of pages of the read out image data at the time of reading out said image data by said read out control section;
a second memory section that stores the count value counted by said counter;
a comparison section that compares the count value stored in said first memory section and the count value stored in said second memory section; and
a control section that carries out error processing when there is an inequality in the comparison result in said comparison section, judging that an error has occurred in a printing operation of the image forming apparatus.

7. The image forming apparatus according to claim 6, wherein the predetermined number of pages is a number of all pages of the image data.

8. The image forming apparatus according to claim 6, wherein the predetermined number of pages is 1 and the first memory section stores a prescribed number of pixels for each page.

9. The image forming apparatus according to claim 6, wherein the error processing includes an error notification processing of notifying the user about the error.

10. A computer-readable storage medium having a computer program stored thereon that is readable by a computer for controlling an image forming apparatus, wherein the computer program causes the computer to execute steps of:
repetitively reading out image data from a storage section that stores said image data for a specified number of copies;
forming images for the specified number of copies based on the read out image data;
counting for each of the specified number of copies a number of pixels included in the read out image data at the time of reading out said image data;
storing, at the time of reading out the image data of $n^{th}$ copy (where n is an integer equal to 1 or more but less than the specified number of copies), in a first memory section the count value for the $n^{th}$ copy counted in said counting step;
storing, at the time of reading out the image data of the $(n+1)^{th}$ copy and beyond, in a second memory section the count value of the $(n+1)^{th}$ copy and beyond counted in said counting step;
comparing the count value for the $n^{th}$ copy stored in said first memory section and the count value for the $(n+1)^{th}$ copy stored in said second memory section when the writing operation for a predetermined number of pages of the $(n+1)^{th}$ copy has been completed; and
carrying out error processing when there is an inequality in the comparison result in said comparison section judging that an error has occurred in a printing operation of the image forming apparatus.

11. The computer-readable storage medium according to claim 10, wherein n=1.

12. The computer-readable storage medium according to claim 10, wherein the predetermined number of pages is a number of all pages of the image data.

13. The computer-readable storage medium according to claim 10, wherein the predetermined number of pages is 1 and the first memory section stores a count value for each page.

14. The computer-readable storage medium according to claim 10, wherein the error processing includes an error notification processing of notifying the user about the error.

15. A computer-readable storage medium having a computer program stored thereon that is readable by a computer for controlling an image forming apparatus, wherein the computer program causes the computer to execute steps of:
repetitively reading out image data from a storage section that stores said image data;
forming images for a specified number of copies based on the read out image data;
storing as a reference value in a first memory section the number of pixels for each of the pages of said image data wherein the number of pixels is entered by an operator;
counting the number of pixels included in each of the predetermined number of pages of the read out image data at the time of reading out said image data;
storing in a second memory section the count value counted by said counting the number of pixels included in each of the predetermined number of pages of the read out image data;
comparing the reference value stored in said first memory section and the count value stored in said second memory section; and
carrying out error processing when there is an inequality in the comparison result in said comparison step, judging that an error has occurred in a printing operation of the image forming apparatus.

16. The computer-readable storage medium according to claim 15, wherein the predetermined number of pages is a number of all pages of the image data.

17. The computer-readable storage medium according to claim 15, wherein the predetermined number of pages is 1 and the first memory section stores a prescribed number of pixels for each page.

18. The computer-readable storage medium according to claim 15, wherein the error processing includes an error notification processing of notifying the user about the error.

19. A method of detecting error of printing process in an image forming apparatus comprising:
repetitively reading out image data from a storage section that stores said image data for a specified number of copies;

forming images for the specified number of copies based on the read out image data;

counting for each of the specified number of copies the number of pixels included in the read out image data at the time of reading out said image data;

storing, at the time of reading out the image data of $n^{th}$ copy (where n is an integer equal to 1 or more but less than the specified number of copies), in a first memory section the count value for the $n^{th}$ copy counted in said counting step;

storing, at the time of reading out the image data of the $(n+1)^{th}$ copy and beyond, in a second memory section the count value of the $(n+1)^{th}$ copy and beyond counted in said counting step;

comparing the count value for the $n^{th}$ copy stored in said first memory section and the count value for the $(n+1)^{th}$ copy stored in said second memory section when the writing operation for a predetermined number of pages of the $(n+1)^{th}$ copy has been completed; and carrying out error processing when there is an inequality in the comparison result in said comparison section judging that an error has occurred in a printing operation of the image forming apparatus.

20. A method of detecting error of printing process in an image forming apparatus comprising:

repetitively reading out image data from a storage section that stores said image data;

forming images for a specified number of copies based on the read out image data;

storing as a reference value in a first memory section the number of pixels for each of a predetermined number of pages of said image data wherein the number of pixels is entered by an operator;

counting the number of pixels included in each of the predetermined number of pages of the read out image data at the time of reading out said image data;

storing in a second memory section the count value counted by said counter;

comparing the reference value stored in said first memory section and the count value stored in said second memory section; and carrying out error processing when there is an inequality in the comparison result in said comparison step, judging that an error has occurred in a printing operation of the image forming apparatus.

* * * * *

UNITED STATES PATENT AND TRADEMARK OFFICE
CERTIFICATE OF CORRECTION

| | | |
|---|---|---|
| PATENT NO. | : 8,305,623 B2 | Page 1 of 1 |
| APPLICATION NO. | : 11/518676 | |
| DATED | : November 6, 2012 | |
| INVENTOR(S) | : Ushio | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1397 days.

Signed and Sealed this
Second Day of September, 2014

Michelle K. Lee
*Deputy Director of the United States Patent and Trademark Office*